United States Patent [19]

Cawthorn

[11] 3,776,559

[45] Dec. 4, 1973

[54] SHAFT SEALS
[75] Inventor: Trevor Lewis Cawthorn, Norfolk, England
[73] Assignee: Cooper Roller Bearings Company Limited, King's Lynn, Norfolk, England
[22] Filed: Jan. 18, 1971
[21] Appl. No.: 106,976

[30] Foreign Application Priority Data
Oct. 20, 1970  Germany............. P 20 51 500.8
Oct. 20, 1970  Japan........................ 45/91691

[52] U.S. Cl.................... 277/56, 277/178, 277/220
[51] Int. Cl............................................. F16j 15/48
[58] Field of Search................... 277/101, 138, 151, 277/152, 154, 157, 178, 216, 220, 221, 223, 224, 56, 53; 285/373

[56] References Cited
UNITED STATES PATENTS
R8,085   2/1878   Stephenson..................... 277/216 X
2,759,777   8/1956   Anderson........................ 277/220 X FOREIGN PATENTS OR APPLICATIONS
496,107   11/1938   Great Britain...................... 277/216
130,696   1/1951   Sweden............................... 277/220
172,087   6/1906   Germany............................ 277/157
273,463   7/1927   Great Britain...................... 277/178
1,077,014   3/1960   Germany............................ 277/178

OTHER PUBLICATIONS
German Printed Application 1,077,014 3-1960 Niessen.

Primary Examiner—Samuel B. Rothberg
Attorney—William Anthony Drucker

[57] ABSTRACT

A shaft seal comprising a split annular body made of resilient material to surround and engage the shaft and a split ring adapted to surround the body and having its ends shaped to engage each other in a locked condition.

4 Claims, 3 Drawing Figures

PATENTED DEC 4 1973 3,776,559
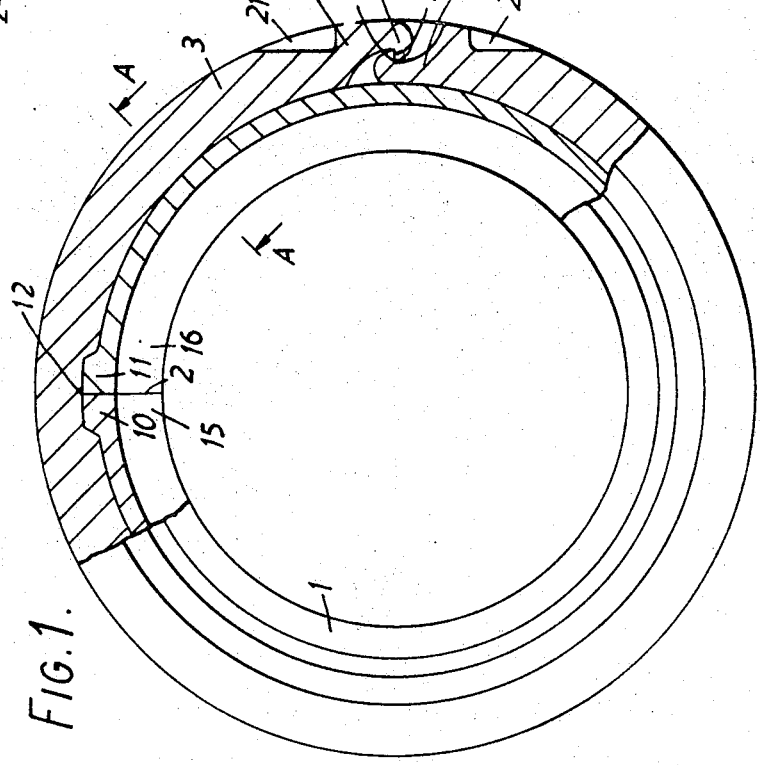
FIG. 1.
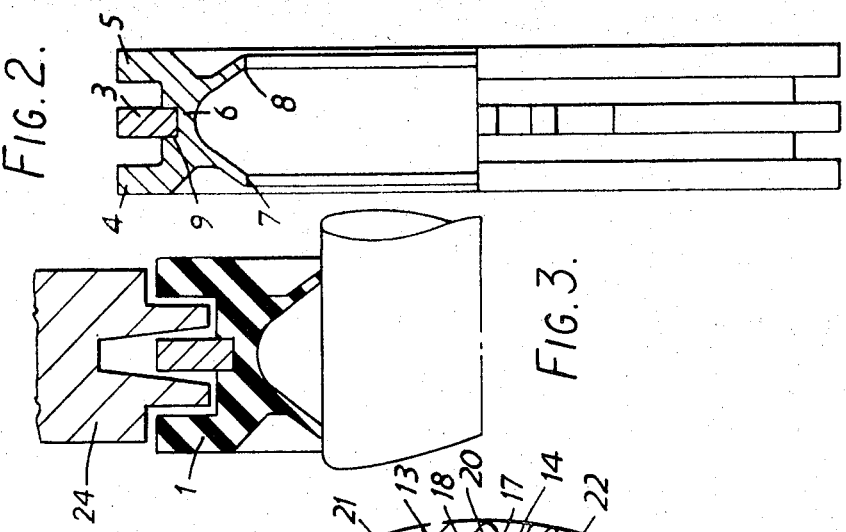
FIG. 2.
FIG. 3.

SHAFT SEALS

This invention relates to shaft seals e.g. for rotating shafts and more particularly but not solely to seals of the triple labyrinth type.

In one known triple labyrinth seal there is provided an annular metallic die-cast body having machined grooves in its inner and outer peripheries, the inner ones of which are provided with rubber 'O' rings which cause the seal to rotate in use with a suitable shaft and the outer ones of which co-operate with a suitable housing through which the shaft projects. The seal is split preferably at diametrically opposite points and each join is effected by a tongue and groove connection which is secured by means of a pin extending at 90° to the side faces of the seal.

Such a seal has the disadvantage that it is difficult to assemble or disassemble on the shaft due to the space required for withdrawing the securing pins. Furthermore, owing to the limited resilience of the 'O' rings such a seal is only suitable for use with one diameter shaft.

According to the present invention there is provided a shaft seal comprising a split annular body made of resilient material to surround and engage the shaft and a split ring adapted to surround the body and having its ends shaped to engage each other in a locked condition.

In a preferred example of the invention the seal in the form of a triple labyrinth seal is split and is retained in one position on the shaft by means of a split ring or circlip which is arranged to locate in a groove on the outside diameter of the resilient seal, the free ends of which circlip are preferably adapted to engage one with the other in a locked condition by a snap action.

Therefore, owing to the omission of a retaining pin as used in the prior art arrangement, the construction of the seal according to the present invention may be simple to assemble and disassemble, the minimum of space being required. Furthermore, since the seal is formed from a resilient material such as rubber or a plastics material for example, the shaft to which the seal is applied may be one of a number of different diameters.

A constructional embodiment of the invention will now be described, by way of example, with reference to the accompanying drawing, in which;

FIG. 1 is a part-sectional side view of a triple labyrinth seal according to the present invention; and FIG. 2 is a part sectional end view of the seal taken along the line A—A of FIG. 1.

FIG. 3 is part sectional view of the seal in cooperation with the housing and shaft.

Referring now to FIG. 1 of the drawings there is provided an annular body 1 having a single split 2. Around the body 1 there is provided a split ring or circlip 3.

The body is formed from an elastic (e.g. rubber or synthetic rubber) material which is soft enough to make a good seal with the shaft on its inner diameter and with a housing on its outside diameter. The circlip is made of more rigid material such as steel, a rigid synthetic plastics material or aluminium.

In FIG. 2 the annular body 1 is shown to have an approximately H-shaped cross-section to form two outer and two inner sealing peripheries, the outer arms or flanges 4, 5 of which are perpendicular to cross-piece 6 while the lower arms or flanges 7, 8 are arranged to diverge from cross-piece 6. The body 1 is formed of rubber or synthetic rubber which is provided with a single groove 9 between the flanges 4, 5 for receiving the circlip 3. The circlip 3 is located by the groove 9 between and spaced from the flanges 4, 5 to form a third outer sealing periphery. The circlip 3 is located circumferentially by means of two tapered protrusions 10, 11 formed on the body 1 in the groove 9 on opposite sides of the split 2, which co-operate with a complementary cut-out 12 in the base of a circlip, such that when the circlip ends 13, 14 are locked together the two ends 15, 16 of the annular body 1, which form the split 2, are drawn together thereby eliminating any tendency for a gap to be present at the joint.

The ends 13, 14 of the circlip 3, as is clearly seen in FIG. 1, are hook-like and have engaging flat surfaces 17, 18 respectively. The hooks have rounded outer surfaces 20 whereby they can be forced over each other into snap-action engagement. The ends of the circlip are necked at 21, 22 to give extra flexibility to the engaging ends.

In use the body 1 is assembled radially on a shaft (not shown) so that co-operating faces of the body at the split 2 butt one against the other. At this stage of assembly the relative dimensions of the body 1 and the shaft are such that the body is movable axially along the shaft, as when shaft expansion takes place due to temperature.

When the body 1 is assembled in its required position as described above, the circlip 3 is positioned in the groove 9. The ends 13, 14 of the circlip are then pressed together so that the ends interlock by means of the engaging faces 17, 18 thereby securely retaining the body 1 in its required position.

Owing to the resilience of the body 1 and thus the flanges 7, 8, the seal is conveniently usable with shafts having an outside diameter less (e.g., up to one sixteenth inch less than the maximum diameter for which the seal is designed).

The flanges 4, 5 and the circlip 3, in use, co-operate with a housing 24 so that when the shaft rotates and expands axially, the circlip 3 is arranged lightly to engage the housing and reposition the seal centrally thereof. Rotation of the seal with the shaft is effected by the frictional grip between the body 1 and the shaft.

It will be appreciated that the above described embodiment of the seal according to the invention is given by way of example only and a number of modifications may be made without departing from the scope of the invention. For example, the body 1 may be formed from any suitable resilient material such as plastic material and may be provided with more than one split 2 or indeed no split at all, however the last mentioned form with no split would have the disadvantage that it must be slid along the shaft to its desired position.

I claim:

1. A shaft seal of the type which provides a triple labyrinth type peripheral sealing in cooperation with a suitable housing through which the shaft projects, said seal comprising an annular body made of resilient material to surround and engage the shaft and a split ring of more rigid material adapted to surround the body and having its ends shaped to engage each other in a locked condition, the body having two annular peripheral resilient flanges projecting radially outwards and spaced apart from the split ring which also projects radially outwards and is located between the resilient flanges when assembled thereby forming two annular peripheral grooves separated by the split ring, said split ring having approximately the same diameter as said annular flanges.

2. A shaft seal of the type which provides a triple labyrinth type peripheral sealing in cooperation with a suitable housing through which the shaft projects, said seal comprising an annular body made of resilient material to surround and engage the shaft and a split ring of more rigid material adapted to surround the body and having its ends shaped to engage each other in a locked condition, the body having two annular peripheral resilient flanges projecting radially outwards and spaced apart from the split ring which also projects radially outwards and is located between the resilient flanges when assembled thereby forming two annular peripheral grooves separated by the split ring, said split ring having approximately the same diameter as said annular flanges, the split ring having hook-like ends provided with flat engaging surfaces and rounded outer surfaces which ride over each other to give a snap engagement.

3. A shaft seal of the type which provides a triple labyrinth type peripheral sealing in cooperation with a suitable housing through which the shaft projects, said seal comprising an annular body made of resilient material to surround and engage the shaft and a split ring of more rigid material adapted to surround the body and having its ends shaped to engage each other in a locked condition, the body having two annular peripheral resilient flanges projecting radially outwards and spaced apart from the split ring which also projects radially outwards and is located between the resilient flanges when assembled thereby forming two annular peripheral grooves separated by the split ring, said split ring having approximately the same diameter as said annular flances, said body and split ring having cooperating shaped parts to locate them circumferentially relatively to each other.

4. A shaft seal of the type which provides a triple labyrinth type of peripheral sealing in cooperation with a suitable housing, said seal comprising an annular body made of resilient material to surround and engage the shaft said body being approximately H-shaped in cross-section to form two annular peripheral flanges projecting radially outwards and two shaft engaging flanges projecting radially inwards, a split ring of more rigid material than the body, a central peripheral groove in said body engaged by said split ring, said split ring extending out of the groove radially and being spaced from the flanges to provide two separated peripheral sealing grooves, said split ring having ends shaped to engage each other with snap action in locked condition and means to locate the body and split ring circumferentially relatively to each other.

* * * * *